(12) United States Patent
Johnson

(10) Patent No.: US 10,891,041 B1
(45) Date of Patent: Jan. 12, 2021

(54) DATA PREPARATION USER INTERFACE FOR AGGREGATE COMPARISON OF DATASETS AT DIFFERENT NODES IN A PROCESS FLOW

(71) Applicant: Tableau Software Inc., Seattle, WA (US)

(72) Inventor: Brice Johnson, Redmond, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 16/541,049

(22) Filed: Aug. 14, 2019

(51) Int. Cl.
*G06F 3/048* (2013.01)
*G06F 3/0484* (2013.01)
*G06T 11/20* (2006.01)
*G06F 3/0481* (2013.01)
*G06T 11/00* (2006.01)
*G06F 9/451* (2018.01)
*G06F 16/2455* (2019.01)
*G06F 16/28* (2019.01)
*G06F 3/0482* (2013.01)

(52) U.S. Cl.
CPC ........ *G06F 3/04847* (2013.01); *G06F 3/0481* (2013.01); *G06F 3/0482* (2013.01); *G06F 9/451* (2018.02); *G06F 16/24553* (2019.01); *G06F 16/287* (2019.01); *G06T 11/001* (2013.01); *G06T 11/206* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,105,000 B1* | 8/2015 | White | G06F 16/244 |
| 2012/0185311 A1* | 7/2012 | Tavares | G06Q 30/0211 |
| | | | 705/14.13 |
| 2018/0101571 A1* | 4/2018 | Zhang | G06F 16/24545 |
| 2018/0354364 A1* | 12/2018 | Hackfort | G06F 9/451 |

* cited by examiner

*Primary Examiner* — Tuan S Nguyen
(74) *Attorney, Agent, or Firm* — Morgan, Lewis & Bockius LLP

(57) ABSTRACT

A method compares data sets in a data preparation application. The method displays a user interface including a data flow pane and a profile pane. The data flow pane displays a flow diagram with nodes, each node corresponding to a data set. When a user selects a first node, the method displays distributions of data values for data fields from a first data set for the first node. When a user selects a second node, the method: (1) forms a composite data set comprising a union of (i) the first data set and (ii) a second data set for the second node; (2) groups data values for each data field to form sets of bins; and (3) displays data value distributions for each data field using the bins. Each bin depicts counts of data values in the bin originating from the first data set and the second data set.

20 Claims, 15 Drawing Sheets

⓫

514 — In response to the second user input (continued):

526 — Display, in the profile pane, distributions of data values for the plurality of data fields in the composite data set, each distribution comprising the respective set of bins for a respective data field. Each displayed bin depicts counts of data values in the respective bin originating from each of the first and second data sets (continued).

538 — A first bin for a first data field includes $m$ data values originating from the first data set and $n$ data values originating from the second data set, with $m < n$. Depict the count of data values for the first bin using a pair of graphical elements, including a first graphical element having a size proportional to $m$ and a second graphical element having a size proportional to $n - m$.

540 — Display the second graphical element in a color corresponding to the second node.

542 — Display the first graphical element in a color that differs from colors of all the nodes in the flow diagram.

544 — A first bin includes data values originating only from the second data set. Depict the count of values in the first bin by displaying a graphical element in a color corresponding to the second node and having a size corresponding to a number of data values in the first bin.

546 — The union includes a first data field that is only from the second data set. Depict a respective count of data values in each bin for the first data field by displaying a respective graphical element in a color corresponding to the second node and having a size corresponding to a respective number of data values in the respective bin.

Figure 5C

| | Col 1 | Col 2 | Col 3 | Col 4 | Col 5 | INPUT_ID |
|---|---|---|---|---|---|---|
| | [1, NODE_ID_1]: 1 | [Foo, NODE_ID_1]: 1 | [xyzzy, NODE_ID_1]: 2 | [AB37: NODE_ID_1]: 1 | [null, NODE_ID_1]: 3 | [NODE_ID_1; 1; NODE_ID_1]: 3 |
| | [2, NODE_ID_1]: 1 | [Bar, NODE_ID_1]: 1 | [plugh, NODE_ID_1]: 1 | [AQ16: NODE_ID_1]: 1 | [4, NODE_ID_2]: 1 | [NODE_ID_2; 1; NODE_ID_2]: 3 |
| | [3, NODE_ID_1]: 1 | [Baz, NODE_ID_1]: 1 | [plugh, NODE_ID_2]: 3 | [CN81: NODE_ID_1]: 1 | [6, NODE_ID_2]: 3 | |
| | [null, NODE_ID_2]: 3 | [Foo, NODE_ID_2]: 1 | [, NODE_ID_2]: 1 | [null, NODE_ID_2]: 1 | [6, NODE_ID_2]: 3 | |
| | [Baz, NODE_ID_2]: 1 | [Bar, NODE_ID_2]: 1 | | | | |
| | | [Baz, NODE_ID_2]: 1 | | | | |

DATA PREPARATION USER INTERFACE FOR AGGREGATE COMPARISON OF DATASETS AT DIFFERENT NODES IN A PROCESS FLOW

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, data frequently needs to be manipulated or massaged to put it into a format that can be easily used by data visualization applications.

SUMMARY

Disclosed implementations provide methods to perform aggregate comparison of datasets at different nodes in a process flow, which can be used as part of a data preparation application.

In accordance with some implementations, a method compares data sets in a data preparation application. The method is performed at a computer system having one or more processors and memory. The memory stores one or more programs configured for execution by the one or more processors. The method displays a user interface that includes a plurality of panes, including a data flow pane and a profile pane. The data flow pane displays a flow diagram having a plurality of nodes, and each node corresponds to a respective data set having a respective plurality of data fields. In response to receiving a first user input selecting a first node in the flow diagram, the method displays, in the profile pane, information about a first data set corresponding to the first node, including displaying distributions of data values for one or more of the data fields from the first data set. The method then receives a second user input to concurrently select a second node in the flow diagram. In response to the second user input, the method (1) forms a composite data set comprising a union of (i) the first data set and (ii) a second data set corresponding to the second node; (2) groups data values for each of a plurality of data fields in the composite data set to form a respective set of bins; and (3) displays, in the profile pane, distributions of data values for the plurality of data fields in the composite data set. Each distribution comprises the respective set of bins for a respective data field, and each displayed bin depicts counts of data values in the respective bin originating from each of the first and second data sets.

In accordance with some implementations, each node is visually indicated by a respective color in the flow diagram.

In accordance with some implementations, each distribution is displayed as an unstacked overlapping bar chart. In accordance with some implementations, a first bin for a first data field in the composite data set contains m data values from the first data set and n data values from the second data set, with m<n. Displaying the first bin comprises displaying a first bar portion having length proportional to m and a second bar portion proportional to n−m. In accordance with some implementations, each node in the flow diagram is visually indicated by a respective color, and the second bar portion is visually indicated by the color corresponding to the second node. In some implementations, the first bar portion is visually indicated by a shade of gray.

In accordance with some implementations, the union comprises each data field from either the first data set or the second data set, without duplication, and comprises each row of data from the first data set and the second data set.

In accordance with some implementations, a first bin includes data values originating only from the second data set, and depicting the count of values in the first bin comprises displaying a graphical element in a color corresponding to the second node and having a size corresponding to the number of data values in the first bin.

In accordance with some implementations, the union includes a first data field that is from both the first data set and from the second data set.

In accordance with some implementations, a first bin for a first data field includes data values originating only from the first data set. In accordance with some implementations, the method further comprises depicting the count of data values for the first bin in a color corresponding to the color of the first node.

In accordance with some implementations, a first bin for a first data field includes m data values originating from the first data set and n data values originating from the second data set, with m<n. In accordance with some implementations, the method further comprises depicting the count of data values for the first bin using a pair of graphical elements, including a first graphical element having a size proportional to m and a second graphical element having a size proportional to n−m. In accordance with some implementations, the method further comprises displaying the second graphical element in a color corresponding to the second node. In accordance with some implementations, the method displays the first graphical element in a color that differs from colors of all the nodes in the flow diagram.

In accordance with some implementations, the union includes a first data field that is only from the second data set, and depicting the respective count of data values in each bin for the first data field comprises displaying a respective graphical element in a color corresponding to the second node and having a size corresponding to a respective number of data values in the respective bin.

In accordance with some implementations, grouping the data values for each data field forms a partition of the data values for the respective data set into a set of bins, and grouping the data values places all equal values for a respective data field into a same bin.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

FIGS. 5A-5C provide a flowchart for performing aggregate dataset comparisons, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
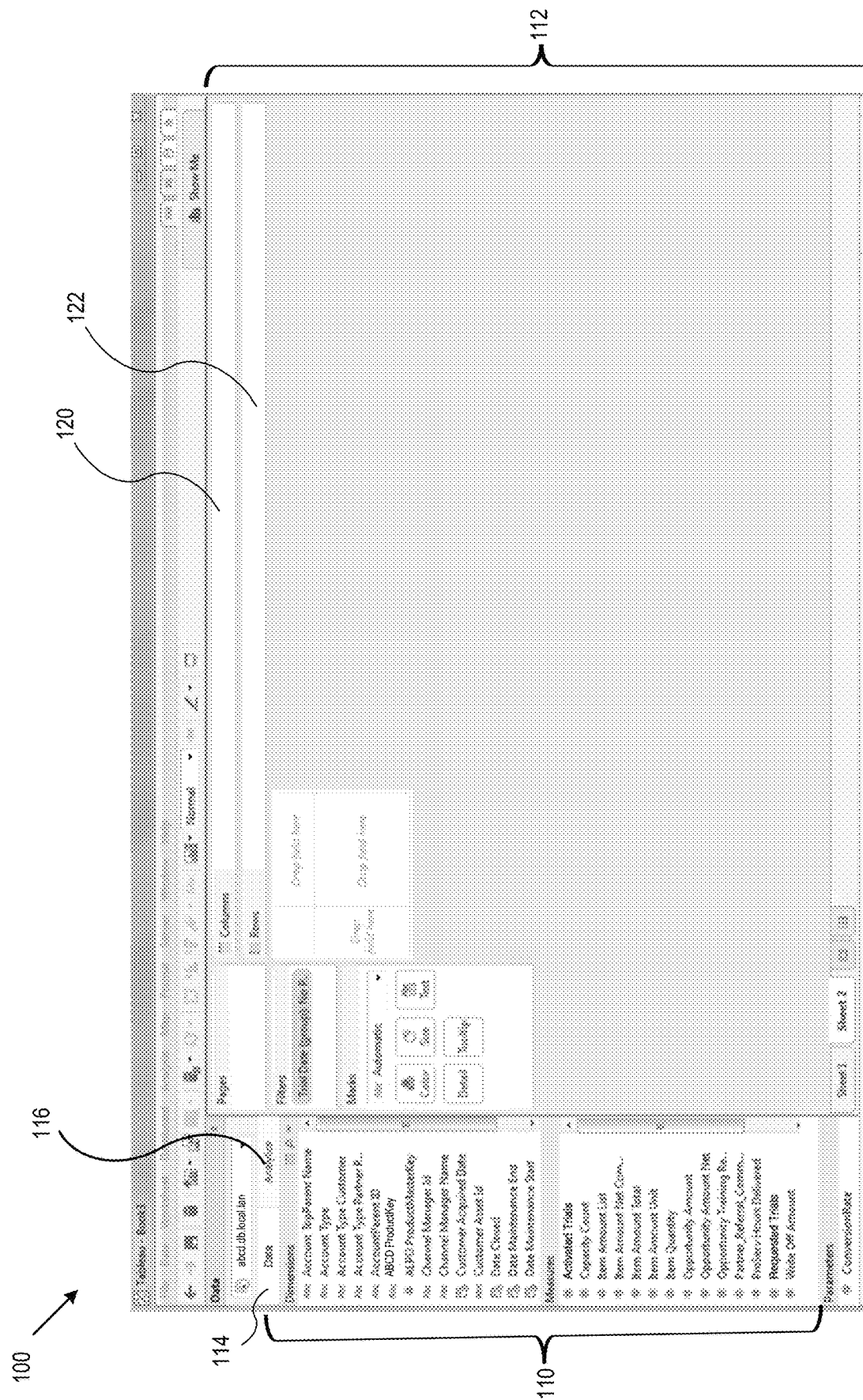
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
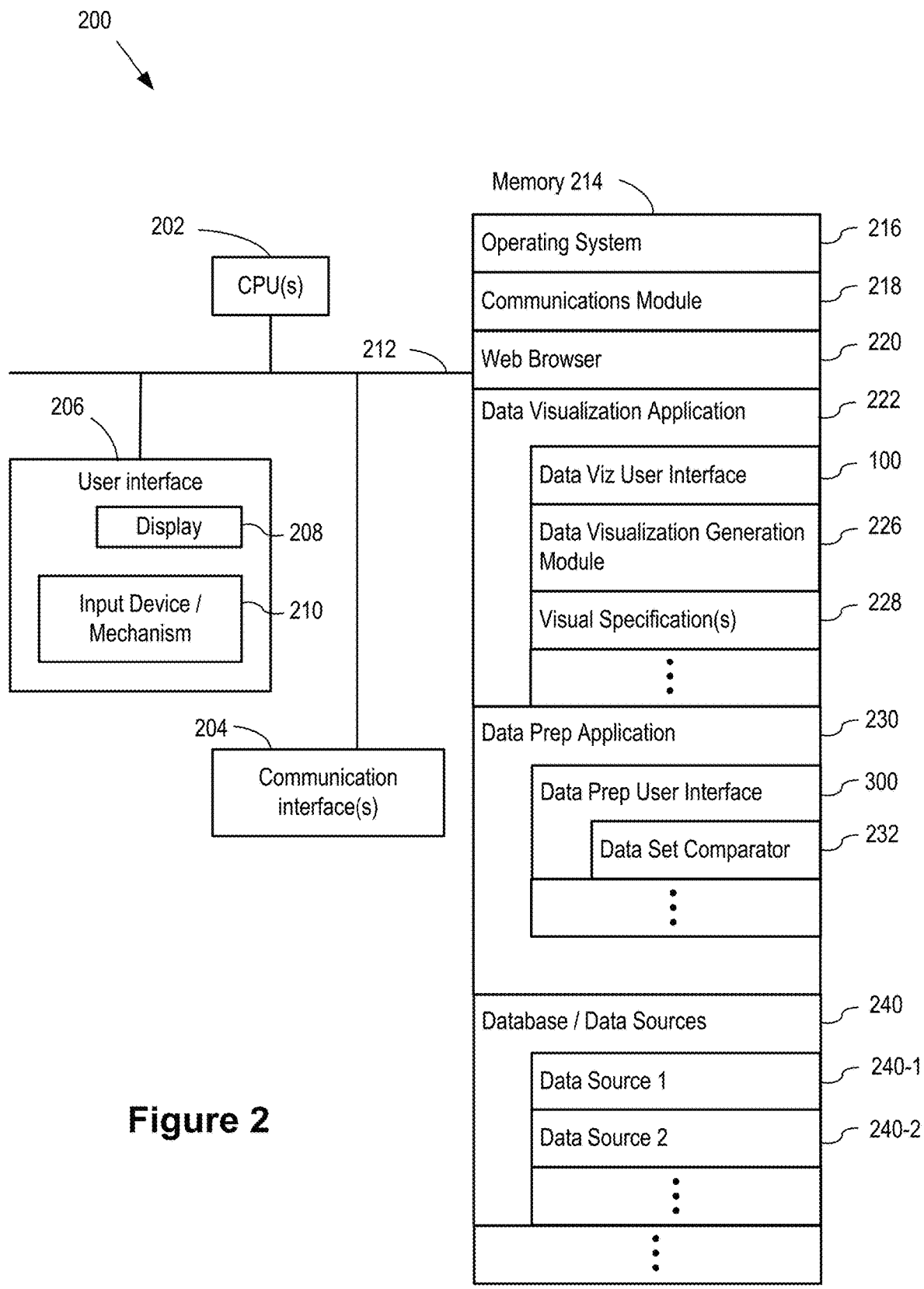
FIG. 2 is a block diagram of a computing device in accordance with some implementations.

FIG. 2 is a block diagram illustrating a computing device 200 that can display the graphical user interface 100 in accordance with some implementations. The computing device can also be used by a data preparation ("data prep") application 230. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and zero or more databases or data sources 240 (e.g., a first data source 240-1 and a second data source 240-2), which are used by the data visualization application 222. In some implementations, the data sources are stored as spreadsheet files, CSV files, XML files, or flat files, or stored in a relational database.

In some instances, the computing device 200 stores a data prep application 230, which can be used to analyze and massage data for subsequent analysis (e.g., by a data visualization application 222). FIG. 3B illustrates one example of a data prep user interface 300. The data prep application 230 enables users to build flows 323, as described in more detail below.

In some implementations, the data prep user interface 300 includes a data set comparator 232. Each node in a flow 323 has an associated data set, and the data set comparator 232 provides a visual comparison of the data sets at two selected nodes. This is illustrated and described below with respect to FIGS. 4A-4F, 5A-5C, and 6A-6G.

Each of the executable modules, applications, or sets of procedures illustrated in FIG. 2 may be stored in one or more of the previously mentioned memory devices, and corresponds to a set of instructions for performing a function described above. The modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
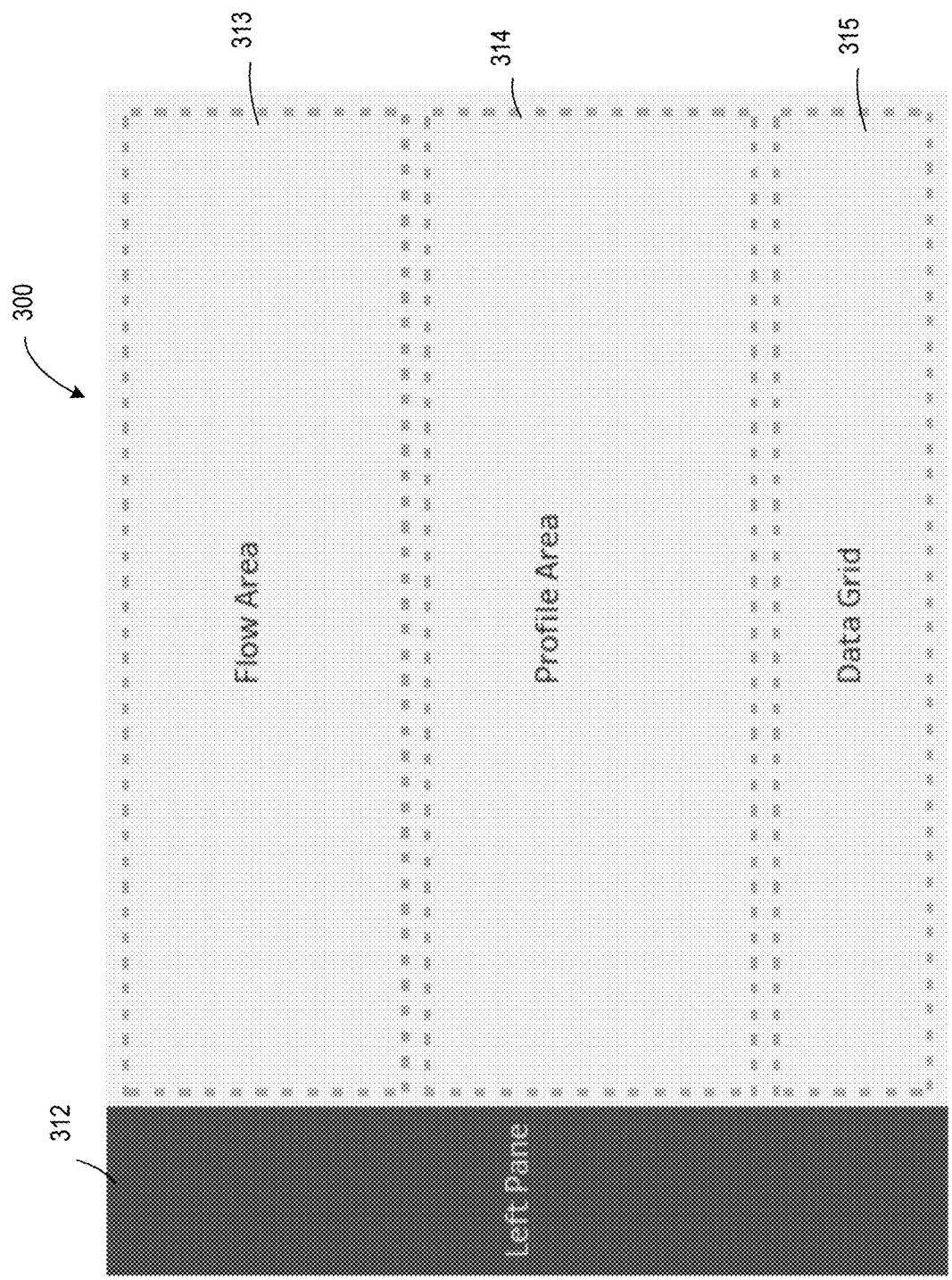
FIGS. 3A and 3B illustrate user interfaces for a data preparation application in accordance with some implementations.
Figure 3B:
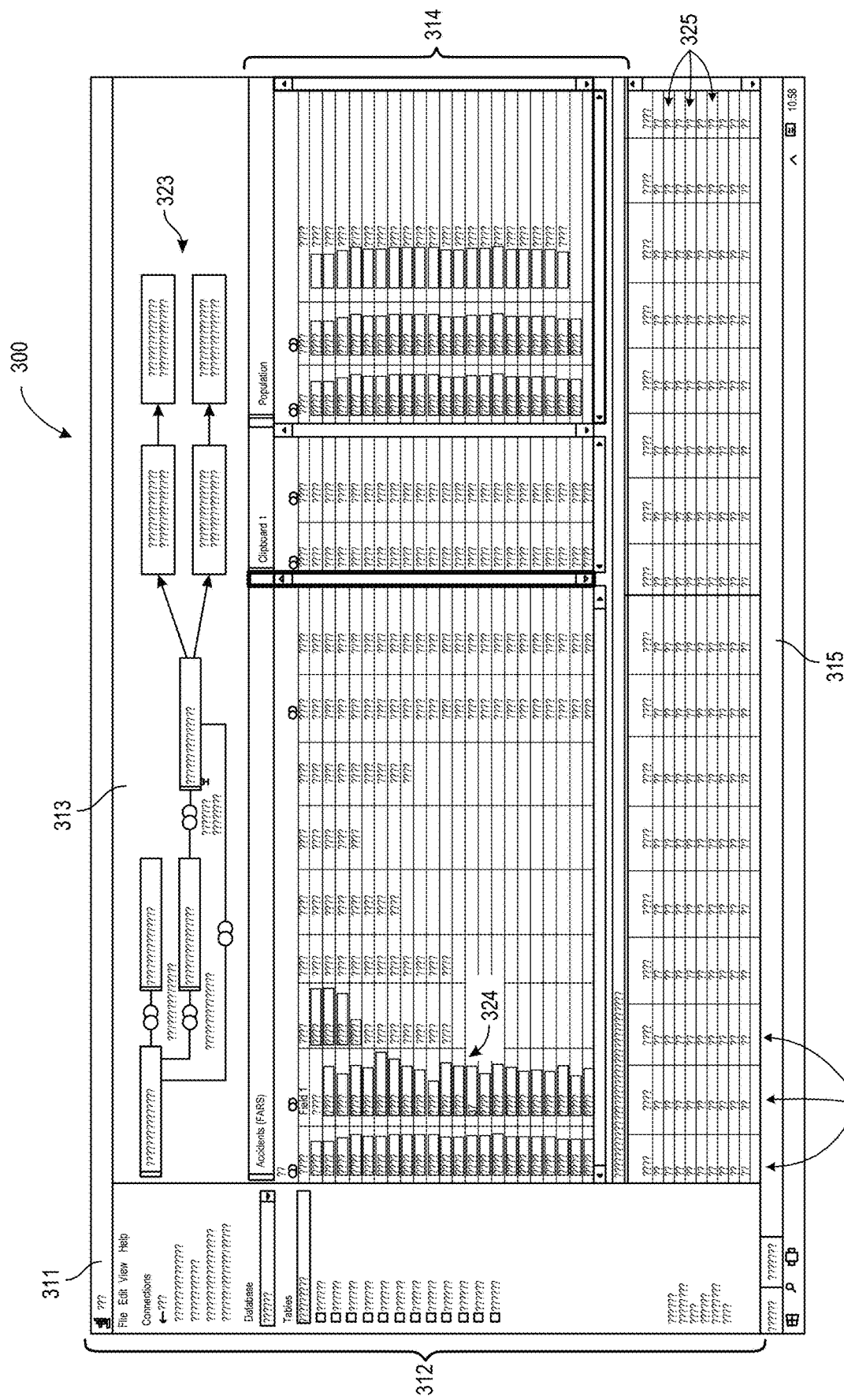

FIGS. 3A and 3B illustrate a user interface for preparing data in accordance with some implementations. In some implementations, there are at least four regions of the user interface. Each of these regions has distinct functionality. FIG. 3A shows this conceptually as a left-hand pane 312, a flow pane 313, profile pane 314, and a data pane 315. In some implementations, the profile pane 314 is also referred to as the schema pane. In some implementations, the functionality of the "left-hand pane" 312 is in an alternate location, such as below the menu pane 311 (shown in FIG. 3B) or below the data pane 315. In some implementations, one of the panes in the user interface comprises two or more panels, with each panel representing or illustrating one or more functions, one or more data sets, or one or more lists. In some implementations more than one pane of the user interface comprises two or more panels, with each panel representing or illustrating one or more functions, one or more data sets, or one or more lists.

FIG. 3A illustrates an overview of a user interface 300 for data preparation, showing panes that group together different functionality. In some implementations, the left-hand pane 312 provides options for a user to locate and connect to data or to perform operations on already selected data. In some implementations the flow area 313 illustrates one or more operations at nodes to perform on selected data (e.g., data manipulations to prepare data for analysis). In some implementations the profile area 314 provides information about the data set at the currently selected node. In some implementations, the data grid 315 provides raw data values in rows and columns of the data set at the currently selected node in the flow area 313.

When a single node in the data flow pane 313 is selected, the profile pane 314 shows distributions of the data values for the columns of the data set corresponding to the selected node. When two nodes in the data flow pane 313 are concurrently selected, the profile pane 314 displays the distributions of data values for the columns in the Union of the data sets corresponding to the two selected nodes. In some implementations, this uses an unstacked, overlapping bar chart. Within this bar chart, gray shaded portions represent overlap of data values. When the count of a specific data value for one of the data sets is greater than the count of the same data value for the other data set, there is a colored portion corresponding to the difference in the counts, and the color corresponds to the data set with the higher count (e.g., having color matching the color of the corresponding node in the flow diagram).

FIG. 3B provides a concrete example of a user interface 300 for data preparation, showing the user interface elements in each of the panes. The menu bar 311 includes one or more menus, such as a File menu and an Edit menu. Although the edit menu is available, more changes to the flow are performed by interacting with the flow pane 313, the profile pane 314, or the data pane 315.

In some implementations, the left-hand pane 312 includes a data source palette/selector. The left-hand pane 312 also includes an operations palette, which displays operations that can be placed into the flow. In some implementations, the list of primary operations includes reshaping operations such as arbitrary joins (of arbitrary type and with various predicates), union, pivot, and aggregate. In some implementations the primary operation comprises inputting or outputting. In some implementations, the list of secondary operations includes renaming and restricting columns, projecting, scalar calculations, filtering, data type conversion, data parse, coalesce, merge, split, value replacement, and sampling. Some implementations also support operators to create sets (e.g., partition the data values for a data field into sets), binning (e.g., grouping numeric data values for a data field into a set of ranges), and table calculations (e.g., calculating data values, such as percent of total, for each row, which depends not only on the data values in each row, but also on other data values in the table).

In some implementations, the left-hand pane 312 also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 313 displays a visual representation (e.g., node/link flow diagram) 323 for the current flow. The Flow Pane 313 provides an overview of the flow, which serves to document the process. As the number of nodes increases, implementations typically add scroll bars. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 313 shows just the nodes within the super node, and the flow pane 313 has a heading that identifies what portion of the flow is being displayed. Implementations typically enable multiple hierarchical levels.

The profile pane 314 provides a quick way for users to figure out if the results of the one or more transforms are what they expect them to be. The profile pane provides distribution data for the data values in the currently selected data set (corresponding to the selected node in the flow pane 313). The distributions are typically displayed as histograms of individual data values or value ranges, such as the bar 324 for the data value "37" in the column for the data field "Field 1." Outliers and incorrect values typically "pop out" visually based on comparisons with both other values in the node or based on comparisons of values in other nodes. The profile pane helps users ferret out data problems, regardless of whether the problems are caused by incorrect transforms or dirty data. In addition to helping users find the bad data, the profile pane also allows direct interactions to fix the discovered problems.

In some implementations, the profile pane 314 updates asynchronously. When a node is selected in the flow pane, the user interface starts populating partial values (e.g., data value distribution histograms) that get better as time goes on. In some implementations, the profile pane includes an indicator to alert the user whether it is complete or not. With very large data sets, some implementations build a profile based on sample data only.

Within the profile pane 314, a user can perform various tasks, including:

Investigating data ranges and correlations. Users can use the profile pane 314 to focus on certain data or column relationships using direct navigation.

Filtering in/out data or ranges of data. Users can add filter operations to the flow 323 through direct interactions. This results in creating new nodes in the flow pane 313.

Transforming data. Users can directly interact with the profile pane 314 in order to map values from one range to another value. This creates new nodes in the flow pane 313.

The data pane 315 provides a way for users to see and modify rows that result from the flows. The data is displayed as a grid with a plurality of rows, such as the rows 325, and a plurality of columns, such as the columns 326. Typically, the data pane selects a sampling of rows corresponding to the selected node (e.g., a sample of 10, 50, or 100 rows rather than a million rows). In some implementations, the rows are sampled in order to display a variety of features. In some implementations, the rows are sampled statistically, such as every nth row. In some implementations, the columns are sampled in order to display a variety of features or to provide a high-level summary of the data. In some implementations, the columns are sampled statistically, such as displaying every mth column.

The data pane 315 is typically where a user cleans up data (e.g., when the source data is not clean or tidy). Like the profile pane, the data pane updates asynchronously. When a node is first selected, rows in the data pane 315 start appearing, and the sampling gets better as time goes on. Most data sets will only have a subset of the data available here (unless the data set is small).

Within the data pane 315, a user can perform various tasks, including:

Sort for navigation. A user can sort the data in the data pane based on a column, which has no effect on the flow. The purpose is to assist in navigating the data in the data pane.

Filter for navigation. A user can filter the data that is in the view, which does not add a filter to the flow.

Add a filter to the flow. A user can also create a filter that applies to the flow. For example, a user can select an individual data value for a specific data field, then take action to filter the data according to that value (e.g., exclude that value or include only that value). In this case, the user interaction creates a new node in the data flow 323. Some implementations enable a user to select multiple data values in a single column, and then build a filter based on the set of selected values (e.g., exclude the set or limit to just that set).

Modify row data. A user can directly modify a row. For example, change a data value for a specific field in a specific row from 3 to 4.

Map one value to another. A user can modify a data value for a specific column, and propagate that change to all of the rows that have that value for the specific column. For example, replace "N.Y." with "NY" for an entire column that represents states.

Split columns. For example, if a user sees that dates have been formatted like "14-Nov-2015", the user can split this field into three separate fields for day, month, and year.

Merge columns. A user can merge two or more columns to create a single combined column.

A node-specific pane displays information that is particular to a selected node in the flow. Because a node specific pane is not needed most of the time, the user interface typically does not designate a region within the user interface that is solely for this use. Instead, a node specific pane is displayed as needed, sometimes using a popup that floats over other regions of the user interface. For example, some implementations use a node specific pane to provide specific user interfaces for joins, unions, pivoting, unpivoting, running Python scripts, parsing log files, or transforming JSON objects into tabular form.

The Data Source Palette/Chooser enables a user to bring in data from various data sources. In some implementations, the data source palette/chooser is in the left-hand pane 312. A user can perform various tasks with the data source palette/chooser, including:

Establish a data source connection. This enables a user to pull in data from a data source, which can be an SQL database, a data file such as a CSV or spreadsheet, a non-relational database, a web service, or other data source.

Set connection properties. A user can specify credentials and other properties needed to connect to data sources. For some data sources, the properties include selection of specific data (e.g., a specific table in a database or a specific sheet from a workbook file).

Figure 4A:
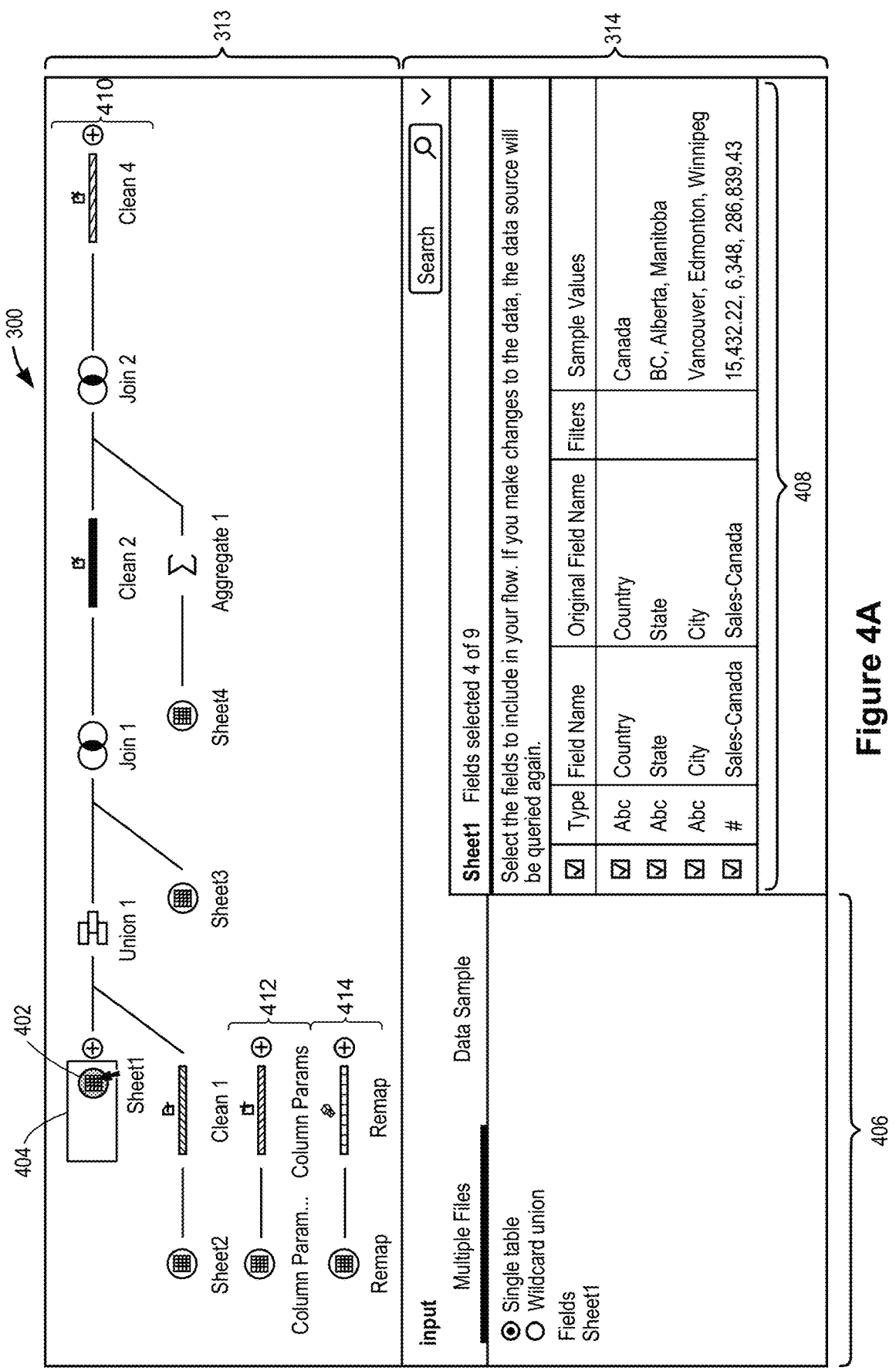
FIGS. 4A-4F illustrate a user interface providing for aggregate dataset comparisons in accordance with some implementations.

FIG. 4A illustrates a data prep user interface 300 providing for analyzing data from multiple nodes concurrently, with a data flow pane 313 and a profile pane 314. In some instances, one or more existing nodes are present in the flow pane 313. In some implementations, each node is visually indicated in the flow diagram. In some implementations, the visual indication includes a respective color for each node. In some implementations, the visual indication includes a respective fill pattern for each node. In some instances, there is a single flow diagram in the flow pane 313, but in other instances there are multiple flow diagrams, such as flow diagrams 410, 412, and 414 in FIG. 4A. Each of these separate flow diagrams 410, 412, and 414 has its own inputs and outputs.

As shown in FIG. 4A, a user has selected a first node 402. In some implementations, the user interface 300 depicts the selected node 402 using an outline 404 or other visual indicator. In this instance, the selected node 402 is a spreadsheet, and the profile pane 314 displays an input selector region 406. In this instance, the node 402 is selecting a single table from the spreadsheet. The profile pane also shows a field selector region 408, which enables the user to select and/or identify which data fields from the spreadsheet will be included in the data set at the selected node 402. In this instance, only four of the nine fields in the spreadsheet are included in the data set at the selected node 402. After displaying the input selector 406 and the field selector 408, the profile pane displays distributions of data for the data fields in the data set at the selected node.

Each node in the data flow pane 313 has a primary data set computed according to the respective node's operation (or operations). Each node typically specifies either a primary operation or one or more secondary operations to clean the primary data set. When a user adds a new node to the data flow pane 313, a new intermediate data set is computed, or initialized as a copy of the data set of the next most recent node in the data flow pane 313. In some implementations, one or more additional panes are included in the user interface.

In some implementations, the profile and data panes are reorganized depending on the selected node, and one or more new panes are displayed, enabling users to manage and coordinate operations performed at the selected node. In some implementations, an additional panel provides for display of two or more data sets at once.

Figure 4B:
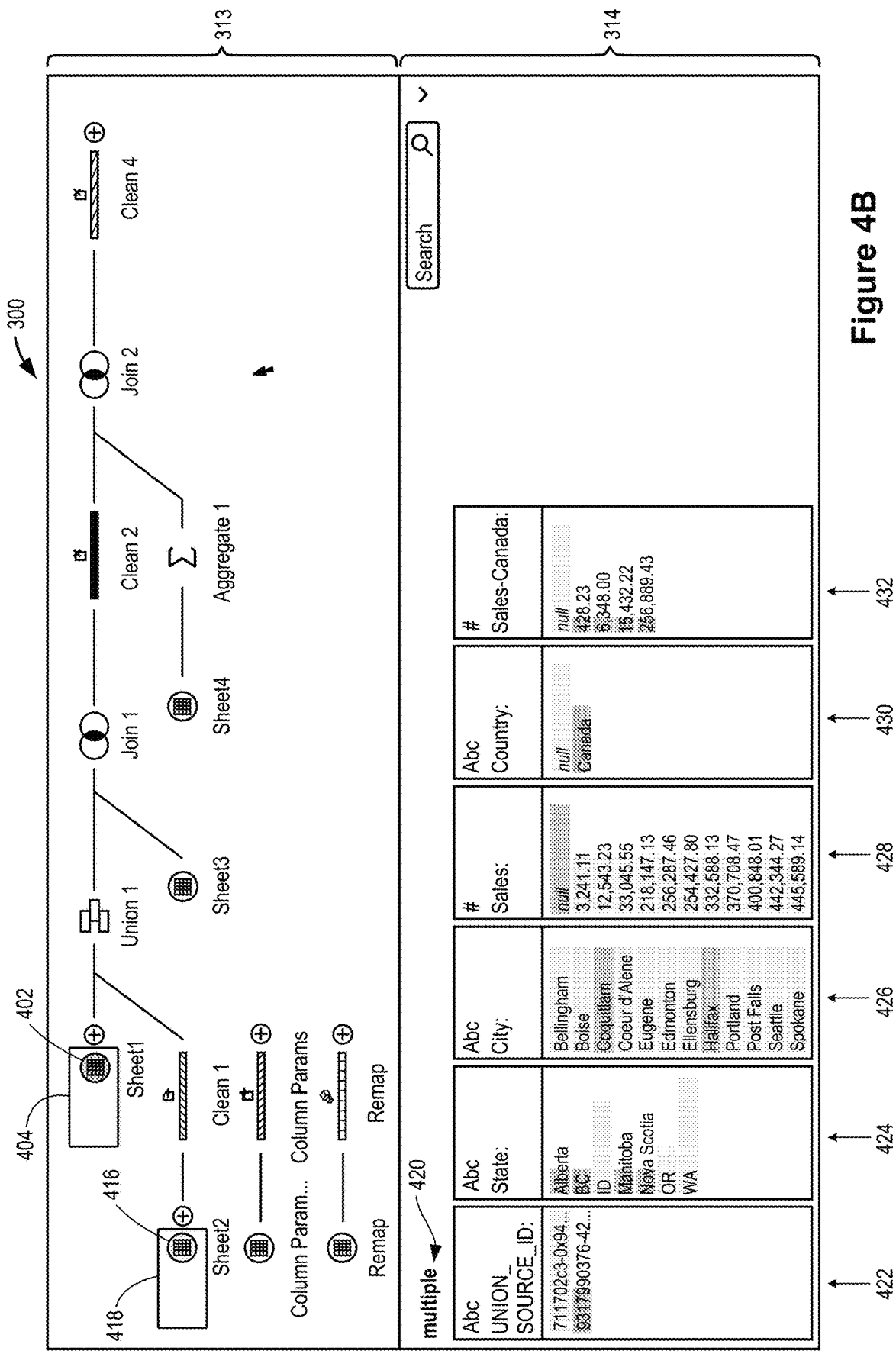

In FIG. 4B, a user has selected a second node 416, with a second data set. In this case, the user has made a second concurrent selection (as indicated by the outline 418 for the second selected node 416 and the outline 404 for the first selected node 402). Because there are two concurrent selections, the user interface 300 displays the label "multiple" 420 in the profile pane 314. Whereas the profile pane shows data distributions for a single data set when a single node is selected, the profile pane provides information about both data sets when two nodes are selected. Some implementations use the techniques illustrated in FIGS. 6A-6G to construct the joint distributions for two data sets.

As shown in FIG. 4B, the profile pane 314 includes data fields that are in either of the data sets associated with the selected nodes. In some implementations, the user interface 300 displays the data in the profile pane as an unstacked overlapping bar chart, which is color coded to identify the proportion of data from each of the data sets. For example, if all of the rows corresponding to a specific data value originate from only one of the data sets, then the bar for that data value has a color corresponding to the color of the corresponding node. If a data value has corresponding rows from both data sets, and there are exactly the same number of rows for both data sets having that data value, then the user interface displays a single bar with a designated color that does not corresponding to the colors of the nodes. In some implementations, the color is a shade of gray. On the other hand, if a data value has corresponding rows from both data sets and the number of rows is not the same, the user interface displays two bars. The first bar is like the previous case, using a fixed color to designate the overlap. The second bar corresponds to the data set with the larger number of rows for the data value, and is colored according to the color of the corresponding node. In all of the above cases, the lengths of the bars are proportional to the number of corresponding rows. Although described with respect to using color, some implementations use shading and/or patterns for the bars (and for the visual representations of the nodes). Because FIGS. 4A-4F are presented in black and white, they are illustrated by shading.

In FIG. 4B, the two selected nodes 402 and 416 correspond to distinct spreadsheet data sources, one representing data for Canada, and the other representing data from the United States. For this particular selection of nodes, there is no overlap of the data, so each of the bars in the profile pane is one of the two colors corresponding the nodes. The combined data set in the profile pane has each of the data fields that is in either (or both) of the data sets, which can be constructed using a Union (see FIGS. 6A-6G). In addition, the combined data set includes a constructed data field "UNION_SOURCE_ID", which is a unique identifier of the original data set. Some implementations omit displaying this data field because it is usually not helpful to users.

The first distribution 422 is for the "UNION_SOURCE_ID", and has only two distinct values. The lighter color bar in the first distribution 422 corresponds to the second selected node 416 and includes data from the United States. The darker color bar in the first distribution 422 corresponds to the first selected node 402, and includes data from Canada. Based on the size of the two bars in the first distribution, a user can see that there is more data from the United States than for Canada. The second distribution 424 shows data for each of the states or provinces. Again there is no overlap, so each bar has a color corresponding to the corresponding source node. The third distribution 426 has cities, and again there is no overlap.

The last three distributions 428, 430, and 432 have nulls, which in this case indicates a field that is in one of the data sets but not the other. Note that the data set for the United States has a "Sales" data field, whereas the data set for Canada has a "Sales-Canada" data field.

In this specific illustration, the data values are treated individually, even for the numeric data fields. In some instances, the data values are binned, particularly for numeric values. Binning groups data values together. For example, numeric values may be grouped into ranges. Binning can also be applied to non-numeric data, such as date fields or other categorical data. In some implementations, the user interface 300 has no a priori indication of how a user might want to bin the data, so by default there is no binning (i.e., each data value is treated separately, as shown in FIG. 4B). In some implementations, a user can specify binning parameters after the distributions are displayed or the user interface may apply binning parameters based on historical usage.

Figure 4C:
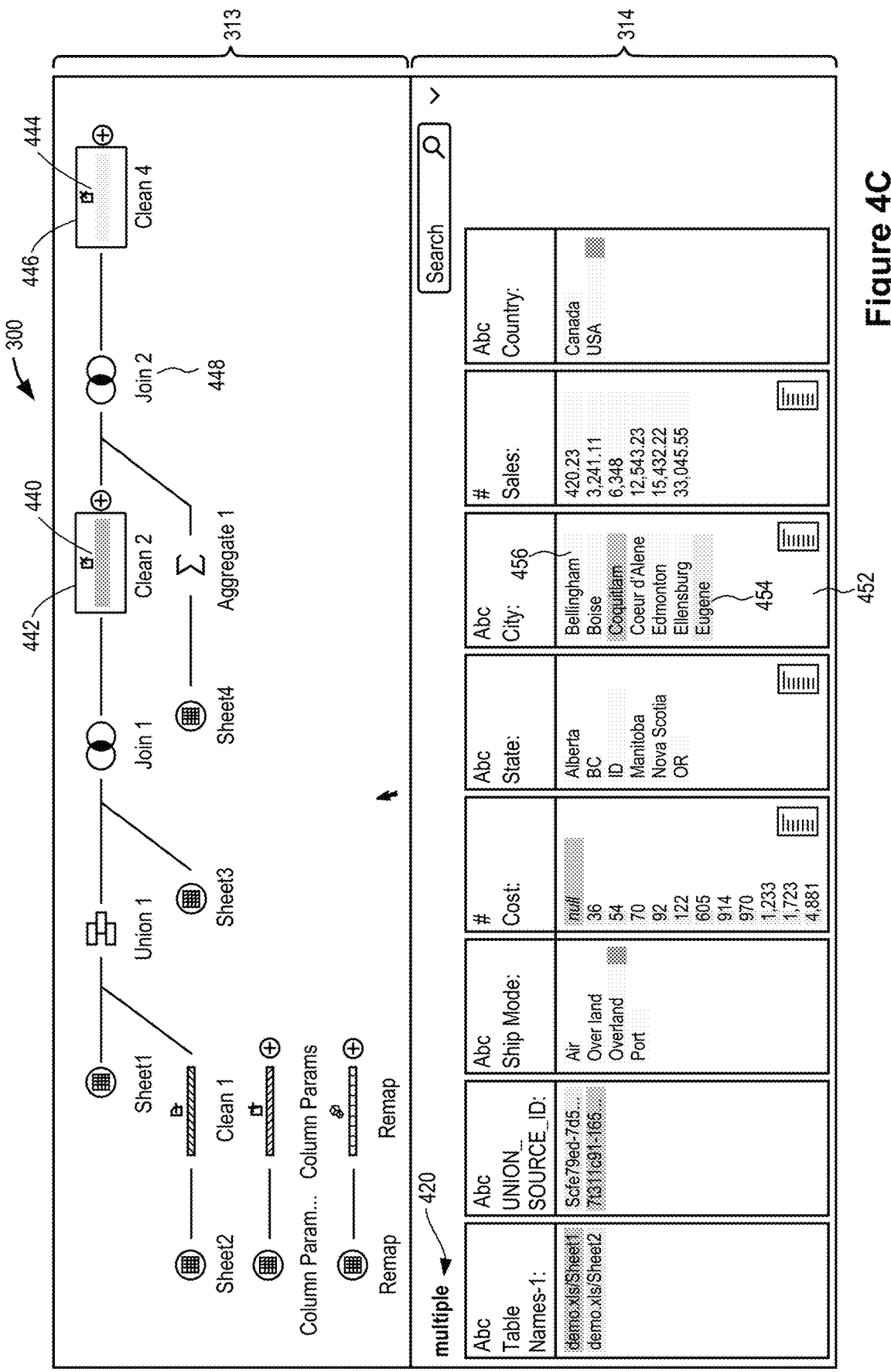

In FIG. 4C, a user has selected two nodes 440 and 444 that are on either side of a Join node 448, so the comparison of the two data sets illustrates the result of applying the join. As before, the selected nodes 440 and 444 are displayed with outlines 442 and 446 to indicate that they are selected. Because two nodes 440 and 444 are selected, the profile pane 314 displays the "multiple" label 420. Each column in FIG. 4C displays distribution data for data values in one data field. For example, the "city" column 452 includes data for the two data values "Bellingham" 456 and "Eugene" 454. As in FIG. 4B, the coloring of the bars indicate the number of rows in each data set having each of the data values.

Figure 4D:
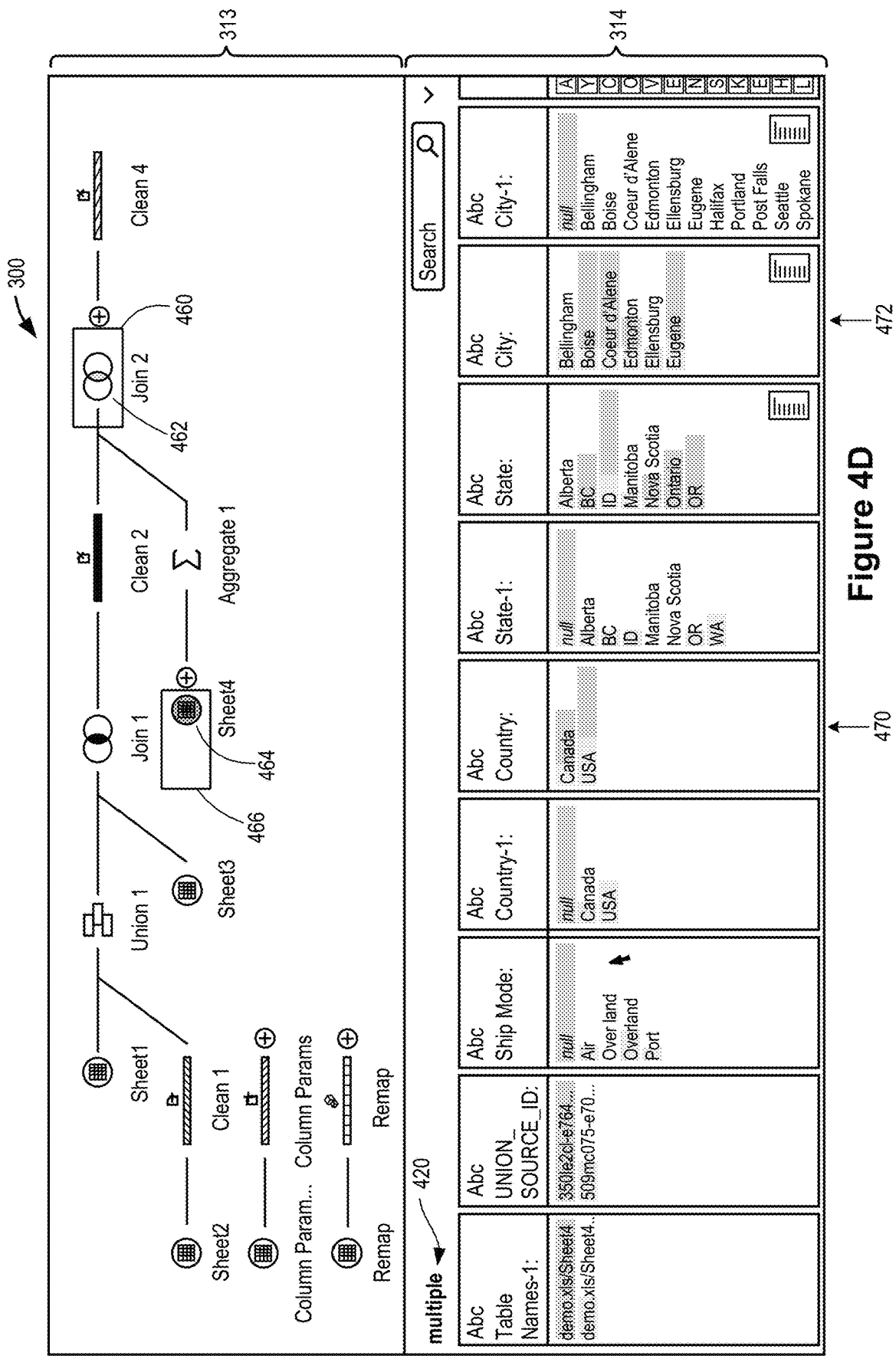

In FIG. 4D, the user has selected two nodes 460 and 464 on either side of a node for an aggregation operation. The outlines 462 and 466 indicate the selection of these two nodes. Because of the aggregation operation, there are fewer rows in the Join 2 node 460 than the Sheet4 node 464. This difference in rows shows up in the distributions in the profile pane 314. For example, in the "country" distribution 470, there are bars for Canada and USA, with a smaller initial portion (shaded light gray in FIG. 4D) corresponding to rows that are in both data sets, and a larger portion (shaded darker gray in FIG. 4D) corresponding to rows that are just in the data set corresponding to the Sheet4 node 464. Note that this darker shade corresponds to the shading of the Sheet4 node 464. In the city distribution 472, the cities "Bellingham" and "Ellensburg" have only a lighter gray portion, indicating that the data sets at both nodes 460 and 464 have the same number of rows for these data values. This suggests that there is only one row for each of these data values in the Sheet4 data set (and therefore the aggregation does not change the number of rows).

Figure 4E:
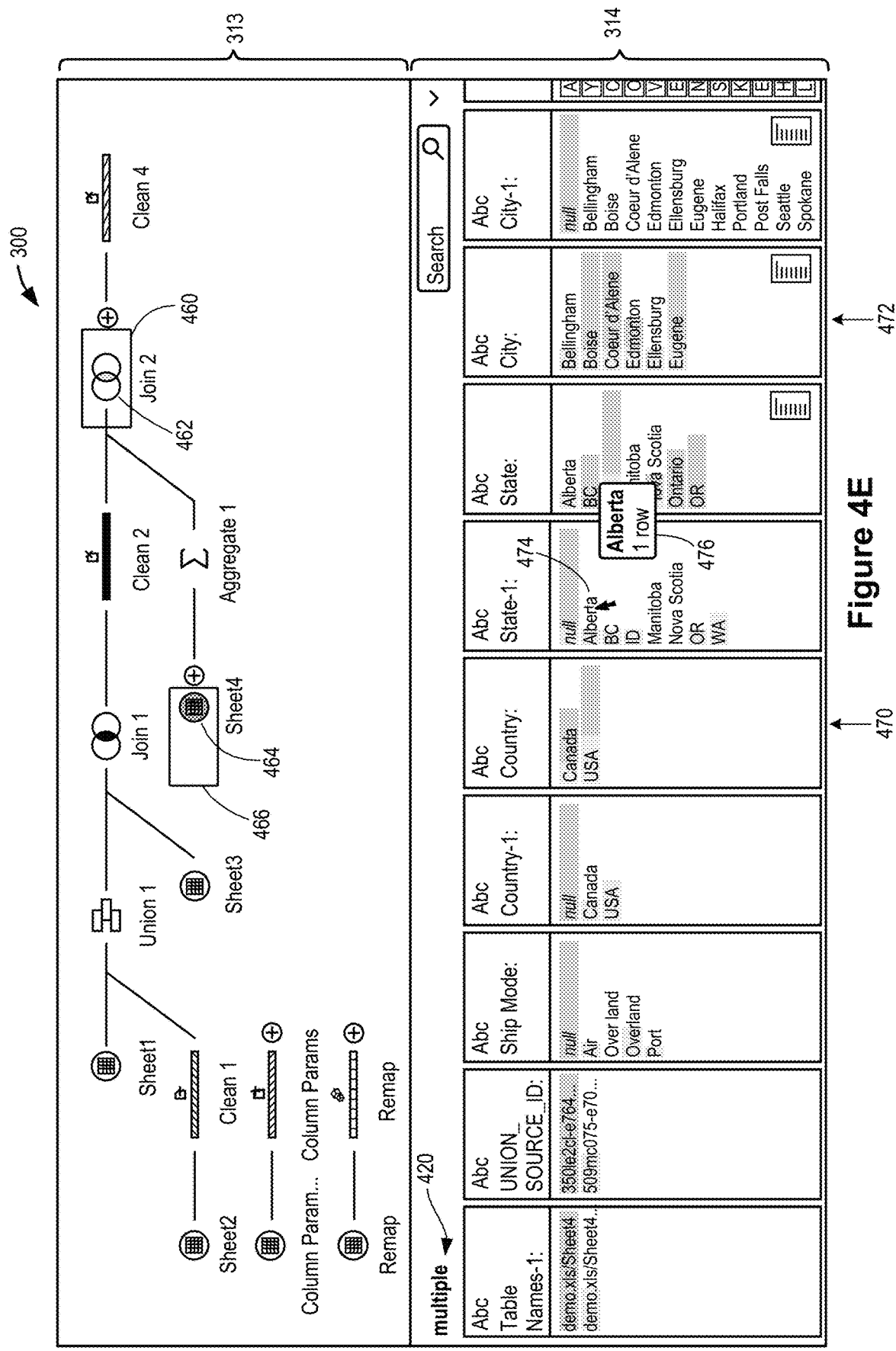

In FIG. 4E, a "hover" gesture over the "Alberta" bar 474 triggers a pop-up 476 that specifies the number of rows (e.g., "1 row") containing having the selected data value. In some implementations, the number of rows is indicated concurrently for multiple data values in the distribution.

Figure 4F:
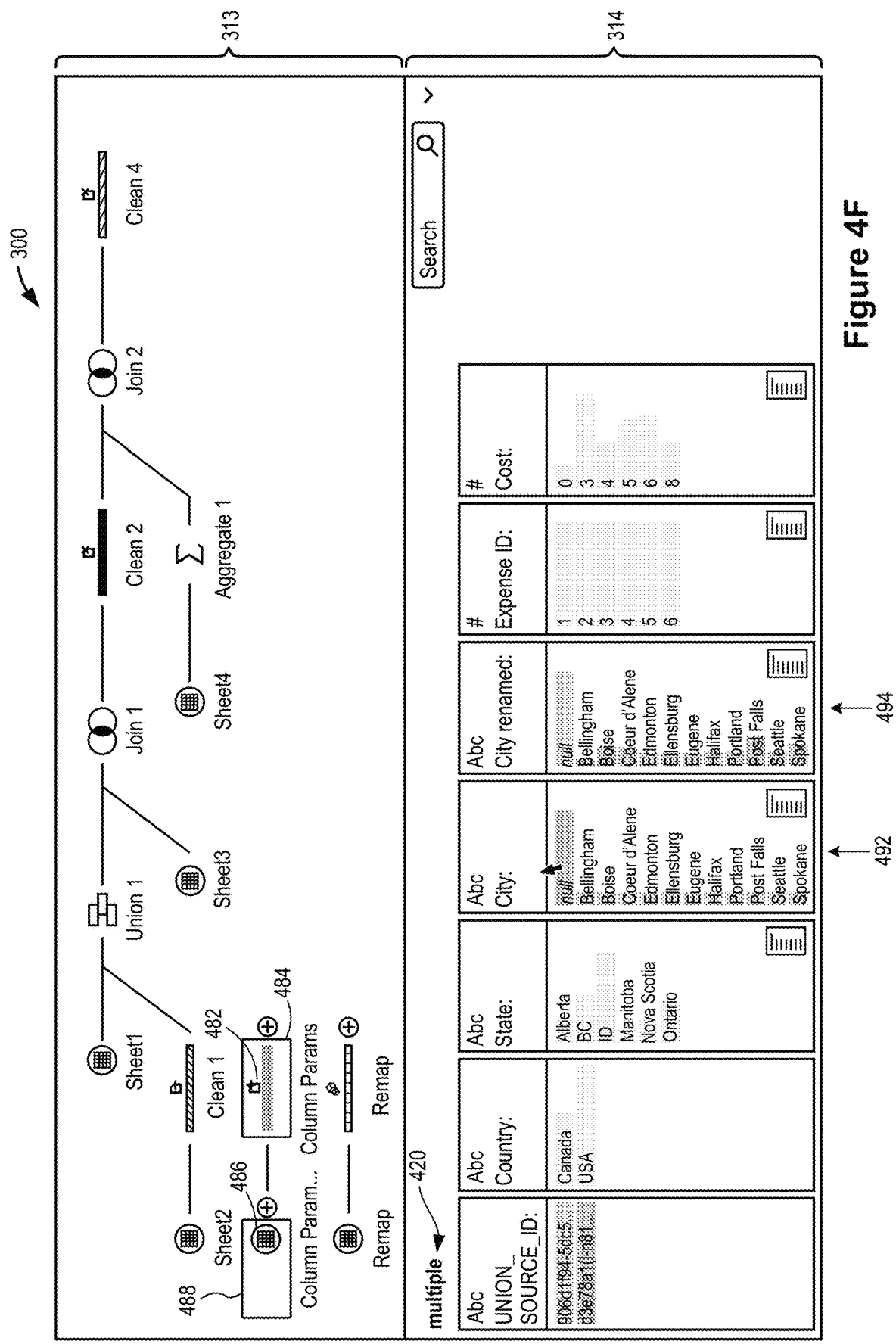

In FIG. 4F the user has selected the two nodes 482 and 486. In this example, the "City" data field in the first data set (for the node 486) is renamed in the second data set (for the node 482). The distributions 492 and 494 illustrate this name change: the distribution 492 for "City" has only data from the first data set (with NULL values from the second data set) and the distribution 494 for "City renamed" has only data for the second data set.

With the multi-node analysis operations described in reference to FIGS. 4A-4F, users are provided with an easy mechanism for curating data flows with multiple nodes. Analyzing unfamiliar data sets is a significant problem in data science. Frequently, one person will prepare a particular analysis. Subsequently, another person or even the same person much later in time will need to understand the initial analysis. It can be inefficient to have to sort through every node one by one. Having the ability to directly compare any two nodes in a data flow significantly increases the efficiency in reanalyzing data flows.

Figure 5A:
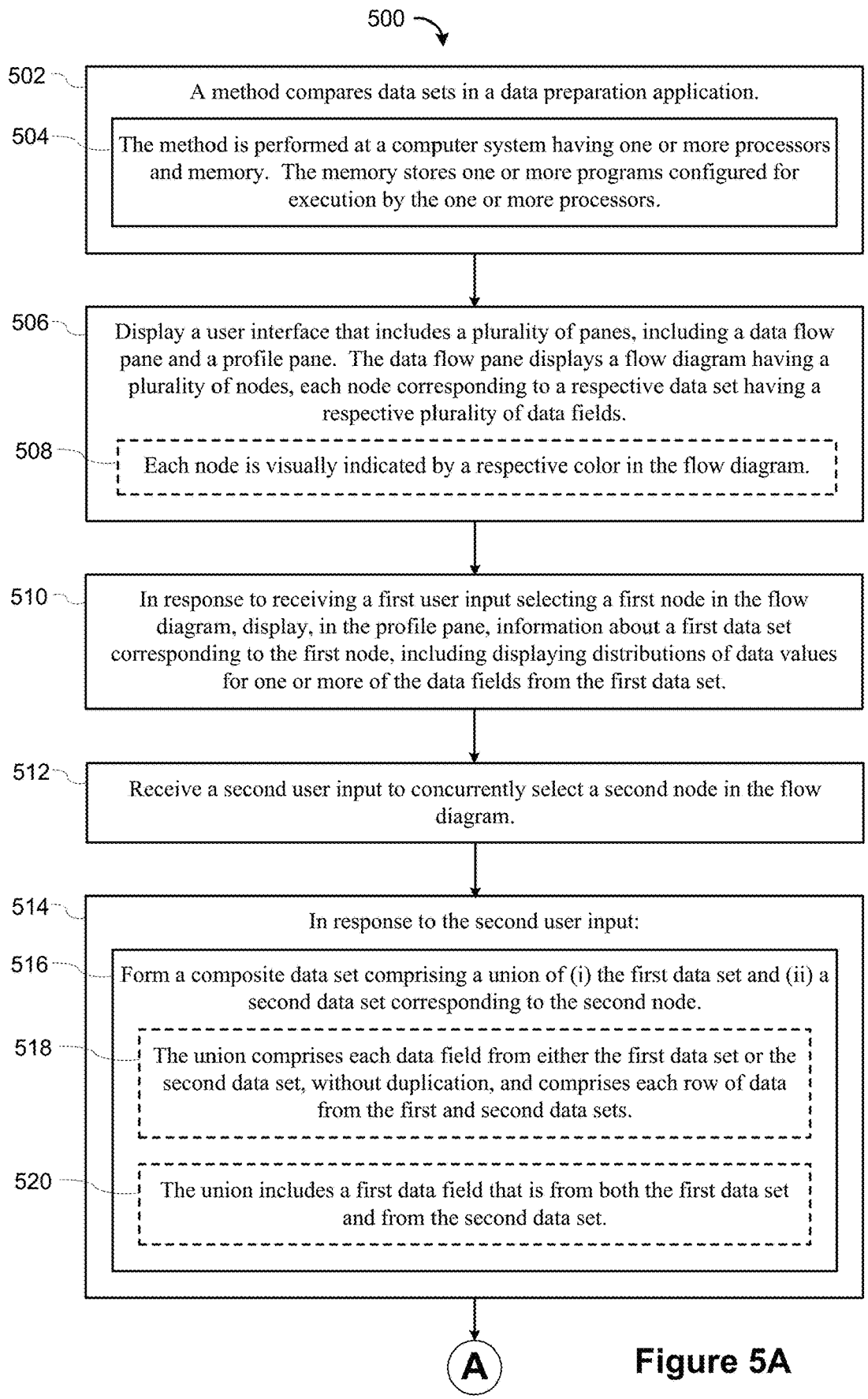
Figure 5B:
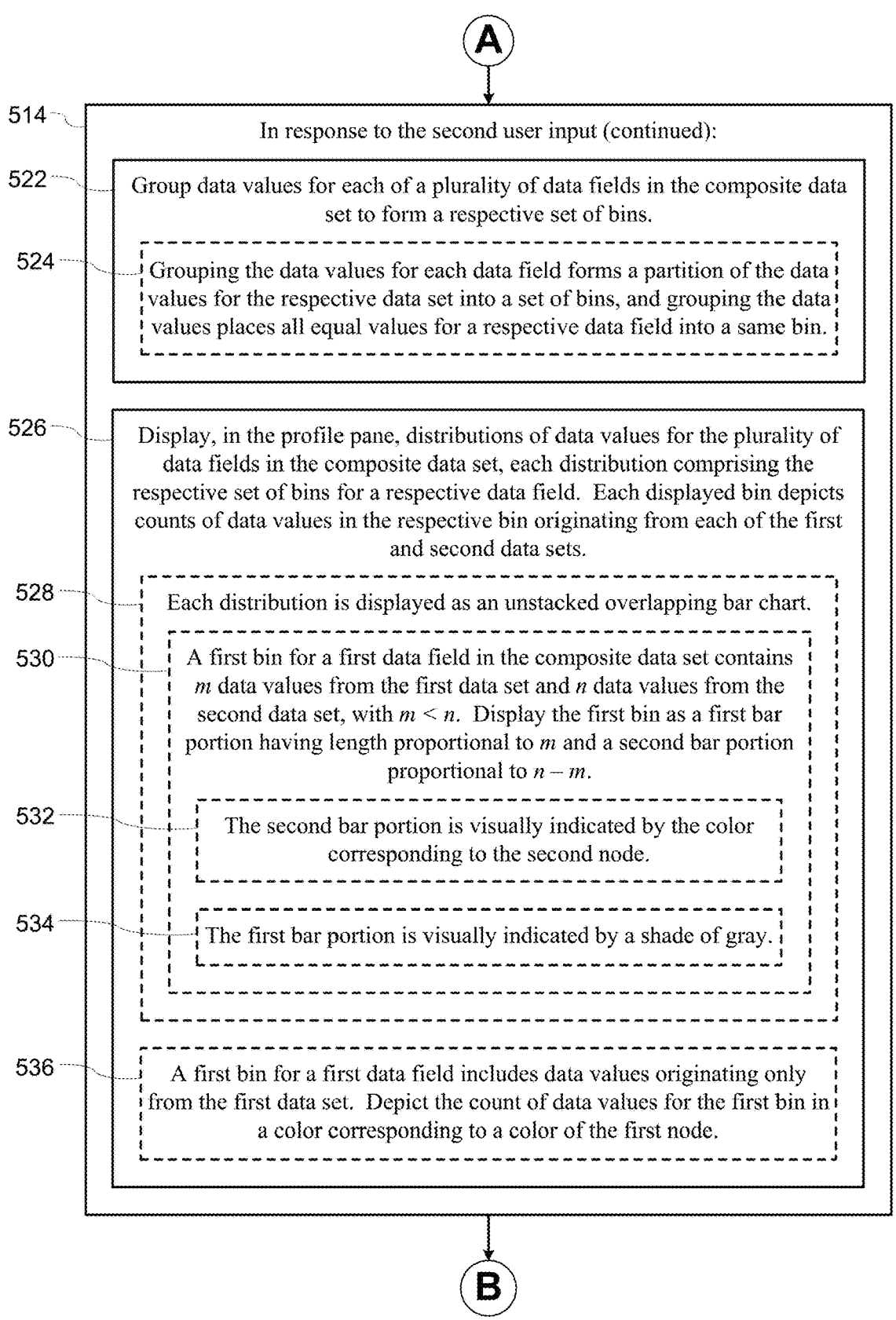

FIGS. 5A-5C provide a flowchart 500 of a process to compare (502) data sets in accordance with some implementations. The method is typically performed (504) at a computer 200 having a display 208, one or more processors 202, and memory 214. The memory stores (504) one or more programs configured for execution by the one or more processors.

The computer displays (506) a user interface that includes a plurality of panes, including a data flow pane 313 and a profile pane 314. The data flow pane 313 displays (506) a flow diagram having a plurality of nodes, each node corresponding to a respective data set having a respective plurality of data fields. In some implementations, each node is visually indicated (508) by a respective color in the flow diagram. In some implementations, each node is visually indicated by a shade or pattern.

A user selects a first node in the flow diagram. In response to receiving the first user input selecting the first node in the flow diagram, the computer displays (510), in the profile pane 314, information about a first data set corresponding to the first node. The information includes (510) distributions of data values for one or more of the data fields from the first data set. This is illustrated above in FIG. 3B.

The computer then receives (512) a second user input to concurrently select a second node in the flow diagram, as illustrated in FIGS. 4B-4F. In response to the second user input, the computer performs (514) several actions. First, the computer forms (516) a composite data set comprising a union of (i) the first data set and (ii) a second data set corresponding to the second node. In some implementations, the union comprises (518) each data field from either the first data set or the second data set, without duplication, and comprises each row of data from the first and second data sets. This is illustrated below in FIGS. 6A-6G. In some instances, the union includes (520) a first data field that is from both the first data set and from the second data set. For example, in FIG. 4C, the data field "City" is in both the first and second data sets.

Further in response to the second user action, the computer groups (522) data values for each of a plurality of data fields in the composite data set to form a respective set of bins. In some instances, each bin represents a single data value; in other instances, one or more bins represent a plurality of data values (e.g., a range of numeric values). In some implementations, grouping the data values for each data field forms (524) a partition of the data values for the respective data set into a set of bins, and grouping the data values places all equal values for a respective data field into a same bin. One of skill in the art recognizes that "partitioning" a set subdivides the set into non-overlapping subsets in which every element from the set is placed into a respective unique one of the subsets. In other words, a partition of a set S is a collection of subsets $S_1, S_2, \ldots, S_k$ with $S = \cup_{i=1}^{k} S_i$ and $S_i \cap S_j = \emptyset$ when $i \neq j$.

Partitioning a column of the composite set uses both the data values for the column as well as the data values of a data set identifier (e.g., the "INPUT_ID" in FIGS. 6A-6G below). Suppose the composite set (e.g., the Union) has n rows, with data set identifiers $d_1, d_2, \ldots, d_n$ and the data values for a certain column are $v_1, v_2, \ldots, v_n$. Let S be the set $\{(v_i, d_i)\}$ where $i = 1, 2, \ldots, n$, and assume S is partitioned into subsets $S_1, S_2, \ldots, S_k$. Rows in the composite set are grouped together when they have the same data value and the same node identifier. That is, for any i and j, if $v_i = v_j$ and $d_i = d_j$, then there is a unique subset $S_m$ with $(v_i, d_i) \in S_m$ and $(v_j, d_j) \in S_m$.

Further in response to the second user action, the computer displays (526), in the profile pane, distributions of data values for the plurality of data fields in the composite data set. Each distribution comprises (526) the respective set of bins for a respective data field. Each displayed bin depicts (526) counts of data values in the respective bin originating from each of the first and second data sets. In some implementations, each distribution is displayed (528) as an unstacked overlapping bar chart.

In some instances, a first bin for a first data field in the composite data set contains (530) m data values from the first data set and n data values from the second data set, with m<n. The computer displays (530) the first bin as a first bar portion having length proportional to m and a second bar portion proportional to n−m. This is illustrated by the distributions 470 and 472 in FIG. 4D. In some implementations, the second bar portion is visually indicated (532) by the color corresponding to the second node. In some implementations, the first bar portion is visually indicated (534) by a shade of gray.

In some instances, a first bin for a first data field includes (536) data values originating only from the first data set. The computer depicts (536) the count of data values for the first bin in a color corresponding to a color of the first node.

In some instances, a first bin for a first data field includes (538) m data values originating from the first data set and n data values originating from the second data set, with m<n. The computer depicts (538) the count of data values for the first bin using a pair of graphical elements, including a first graphical element having a size proportional to m and a second graphical element having a size proportional to n−m.

In this example, the graphical elements are not necessarily unstacked overlapping bars as depicted in FIGS. 4B-4F. For example, the graphical elements can be adjacent icons, adjacent thin bars or sectors of a pie graphic. In some implementations, the computer displays (540) the second graphical element in a color corresponding to the second node. In some implementations, the computer displays (542) the first graphical element in a color that differs from colors of all the nodes in the flow diagram (e.g., gray).

In some instances, a first bin includes (544) data values originating only from the second data set. The computer depicts (544) the count of values in the first bin by displaying a graphical element in a color corresponding to the second node and having a size corresponding to the number of data values in the first bin. This is illustrated by the distributions 422-432 in FIG. 4B.

In some implementations, the union includes (546) a first data field that is only from the second data set. The computer depicts (546) a respective count of data values in each bin for the first data field by displaying a respective graphical element in a color corresponding to the second node and having a size corresponding to the respective number of data values in the respective bin. This is illustrated, for example, by the distributions 492 and 494 in FIG. 4F.

Figure 6A:
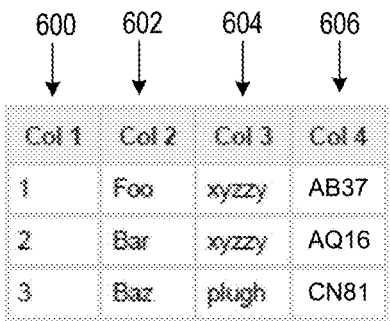
FIGS. 6A-6G illustrate how data from two distinct datasets is aggregated and compared, in accordance with some implementations.
Figure 6B:
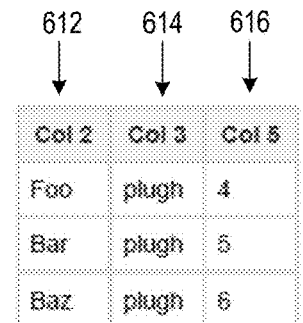

FIGS. 6A-6G provide a skeletal example of how data sets at two nodes can be compared. The first data set in FIG. 6A has four columns (also known as data fields) 600, 602, 604, and 606. The first data set has only three rows. The second data set in FIG. 6B has only three columns 612, 614, and 616, and the second data set has only three rows. The first and second data sets are different, but they share some columns with the same names. Specifically, both column 602 in the first data set and column 612 in the second data set have the column name "Col 1". Similarly, column 604 in the first data set and column 614 in the second data set both have the column name "Col 3". FIGS. 6A and 6B represent the raw data sets at two nodes in a data flow diagram. In some implementations, columns from the two data sets are presumed to represent the same type of data when they share the same column name. In some implementations, they must also share the same data type (or have compatible data types).

Figure 6C:
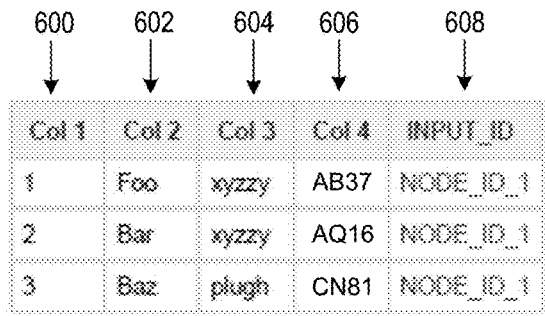
Figure 6D:
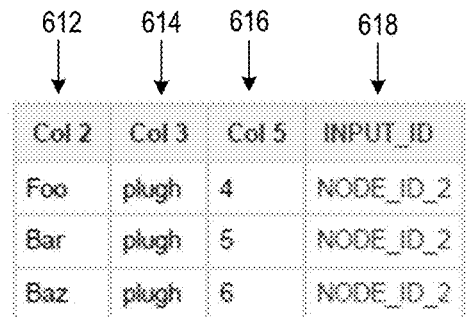

FIGS. 6C and 6D illustrate adding the additional column "INPUT_ID" 608 to the first data set and the additional column "INPUT_ID" 618 to the second data set. In this way, when the rows of these two data sets are combined, there is a clear indicator of where each row came from.

Figure 6E:
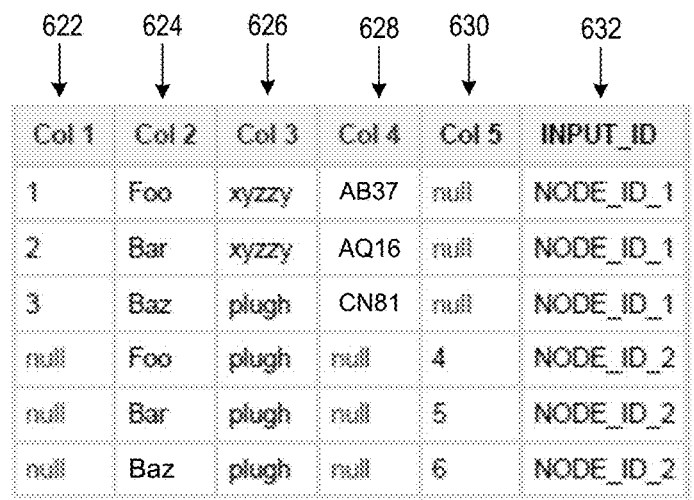

FIG. 6E is the union of the modified data sets in FIGS. 6C and 6D. This composite data set in FIG. 6E has NULL values corresponding to columns that are missing from one or the other of the data sets. The composite data set here has columns 622-632, including every column from either of the data sets, including the INPUT_ID column 632.

Figures 6F, 6G:
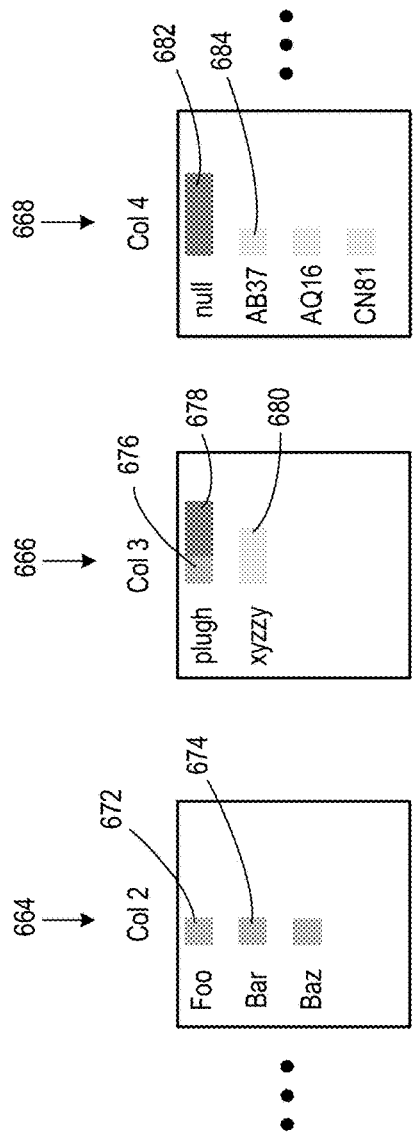

FIG. 6F show a conceptual table formed by aggregating the data from the table in FIG. 6E. In some implementations, this conceptual table is actually stored in memory as a table. In other embodiments, the data is stored in alternative data structures, such as a separate list for each of the columns. The aggregation is performed for each column separately, and the aggregation is based on both the data values for each column as well as the INPUT_ID. For example, in the first column 642 of the aggregated table, there is only one row from the composite table with Col 1=1 and INPUT_ID="NODE_ID_1", so the corresponding first box 654 in FIG. 6F shows a count of 1. On the other hand, there are three rows in the composite table with Col 1=NULL and INPUT_ID="NODE_ID_2", so the corresponding fourth box 656 in FIG. 6F shows a count of 3.

In column 644 in FIG. 6F, all of the counts are 1. Even though there are two rows with the data value "Foo" (and also two rows with the data value "Bar"), the two rows for the data value "Foo" have different INPUT_ID values, so they are not aggregated together.

In column 646 in FIG. 6F, the counts are 2, 1, and 3. The count of 2 is for the data value "xyzzy" and NODE_ID_1, and the count of 3 is for the data value "plugh" and INPUT_ID="NODE_ID_2". There is another row with the data value "plugh", but this other row has a different INPUT_ID. Columns 648, 650, and 652 in FIG. 6F are constructed similarly. Each of the columns in FIG. 6F is used to construct a distribution that can be displayed in the profile pane 314. When there is enough space, generally all of the columns are displayed.

FIG. 6G illustrates how the data from FIG. 6F is displayed graphically in accordance with some implementations. Implementations commonly use color to represent the bars for the distributions, but in FIG. 6G, the colors are depicted as various shades of gray. Within FIG. 6G, it is useful to consider the dark shade of gray as representing a first color (e.g., blue), the lightest shade of gray as representing another color (e.g., yellow), and the medium shade of gray as being an actual shade of gray. The two colors yellow and blue correspond to the colors of the nodes in the flow diagram corresponding to the two data sets.

The distribution 664 for Col 2 shows "gray" colored bars 672 and 674 because the data value "Foo" has one row corresponding to each of the original data sets and the data value "Bar" has one row corresponding to each of the original data sets.

The distribution 666 for Col 3 has two bars. The first portion 676 of the first bar is "gray", corresponding to the data value "plugh" that is in both data sets. The second portion 678 of the first bar (depicted in "blue") indicates that there are more instances of the data value "plugh" in the second data set. The second bar 680, for the data value "xyzzy" is entirely yellow because these data values come only from the first data set.

The distribution 668 for Col 4 has no overlap because the column exists only in the first data set. The bar 682 for the data value NULL represents the three rows from the second data set, and it is depicted in blue because the rows are only from the second data set. The other three data values all correspond to the first data set, so their corresponding bars are yellow, including the bar 684 for the data value "AB37."

The disclosed data prep applications 230 give control to users. In many cases, the data prep application 230 makes intelligent choices for the user, but the user is always able to assert control. Control often has two different facets: control over the logical ordering of operations, which is used to ensure the results are correct and match the user's desired semantics; and physical control, which is mostly used to ensure performance.

The disclosed data prep applications 230 also provide freedom. Users can assemble and reassemble their data production components however they wish in order to achieve the shape of data they need.

The disclosed data prep applications 230 provide incremental interaction and immediate feedback. When a user takes actions, the system provides feedback through immediate results on samples of the user's data, as well as through visual feedback.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for comparing data sets in a data preparation application, comprising:
    at a computer system having one or more processors and memory storing one or more programs configured for execution by the one or more processors:
        displaying a user interface that includes a plurality of panes, including a data flow pane and a profile pane, wherein the data flow pane displays a flow diagram having a plurality of nodes, each node corresponding to a respective data set having a respective plurality of data fields;
        in response to receiving a first user input selecting a first node in the flow diagram, displaying, in the profile pane, information about a first data set corresponding to the first node, including displaying distributions of data values for one or more of the data fields from the first data set;
        receiving a second user input to concurrently select a second node in the flow diagram; and
        in response to the second user input:
            forming a composite data set comprising a union of (i) the first data set and (ii) a second data set corresponding to the second node;
            grouping data values for each of a plurality of data fields in the composite data set to form a respective set of bins; and
            displaying, in the profile pane, distributions of data values for the plurality of data fields in the composite data set, each distribution comprising the respective set of bins for a respective data field, wherein each displayed bin depicts counts of data values in the respective bin originating from each of the first and second data sets.

2. The method of claim 1, wherein each node is visually indicated by a respective color in the flow diagram.

3. The method of claim 1, wherein each distribution is displayed as an unstacked overlapping bar chart.

4. The method of claim 3, wherein a first bin for a first data field in the composite data set contains m data values from the first data set and n data values from the second data set, with m<n, and displaying the first bin comprises displaying a first bar portion having length proportional to m and a second bar portion proportional to n−m.

5. The method of claim 4, wherein each node in the flow diagram is visually indicated by a respective color, and the second bar portion is visually indicated by the color corresponding to the second node.

6. The method of claim 4, wherein the first bar portion is visually indicated by a shade of gray.

7. The method of claim 1, wherein the union comprises each data field from either the first data set or the second data set, without duplication, and comprises each row of data from the first and second data sets.

8. The method of claim 7, wherein the union includes a first data field that is only from the second data set, and depicting a respective count of data values in each bin for the first data field comprises displaying a respective graphical element in a color corresponding to the second node and having a size corresponding to a respective number of data values in the respective bin.

9. The method of claim 1, wherein the union includes a first data field that is from both the first data set and from the second data set.

10. The method of claim 1, wherein a first bin for a first data field includes data values originating only from the first data set, the method further comprising:
    depicting the count of data values for the first bin in a color corresponding to a color of the first node.

11. The method of claim 1, wherein a first bin for a first data field includes m data values originating from the first data set and n data values originating from the second data set, with m<n, the method further comprising:
    depicting the count of data values for the first bin using a pair of graphical elements, including a first graphical element having a size proportional to m and a second graphical element having a size proportional to n−m.

12. The method of claim 11, further comprising displaying the second graphical element in a color corresponding to the second node.

13. The method of claim 12, further comprising displaying the first graphical element in a color that differs from colors of all the nodes in the flow diagram.

14. The method of claim 1, wherein a first bin includes data values originating only from the second data set, and depicting the count of values in the first bin comprises displaying a graphical element in a color corresponding to the second node and having a size corresponding to a number of data values in the first bin.

15. The method of claim 1, wherein grouping the data values for each data field forms a partition of the data values for the respective data set into a set of bins, and grouping the data values places all equal values for a respective data field into a same bin.

16. A computer system comprising:
    one or more processors;
    memory; and
    one or more programs stored in the memory and configured for execution by the one or more processors, the one or more programs comprising instructions for:
        displaying a user interface that includes a plurality of panes, including a data flow pane and a profile pane, wherein the data flow pane displays a flow diagram having a plurality of nodes, each node corresponding to a respective data set having a respective plurality of data fields;
        in response to receiving a first user input selecting a first node in the flow diagram, displaying, in the profile pane, information about a first data set corresponding to the first node, including displaying distributions of data values for one or more of the data fields from the first data set;

receiving a second user input to concurrently select a second node in the flow diagram; and in response to the second user input:
  forming a composite data set comprising a union of (i) the first data set and (ii) a second data set corresponding to the second node;
  grouping data values for each of a plurality of data fields in the composite data set to form a respective set of bins; and
  displaying, in the profile pane, distributions of data values for the plurality of data fields in the composite data set, each distribution comprising the respective set of bins for a respective data field, wherein each displayed bin depicts counts of data values in the respective bin originating from each of the first and second data sets.

17. The computer system of claim 16, wherein a first bin for a first data field includes m data values originating from the first data set and n data values originating from the second data set, with m<n, the one or more programs further comprising instructions for:
  depicting the count of data values for the first bin using a pair of graphical elements, including a first graphical element having a size proportional to m and a second graphical element having a size proportional to n−m.

18. The computer system of claim 17, wherein the one or more programs further comprise instructions for displaying the second graphical element in a color corresponding to the second node.

19. The computer system of claim 16, wherein each distribution is displayed as an unstacked overlapping bar chart.

20. A non-transitory computer-readable storage medium storing one or more programs configured for execution by a computer system having one or more processors, memory, and a display, the one or more programs comprising instructions for:
  displaying a user interface that includes a plurality of panes, including a data flow pane and a profile pane, wherein the data flow pane displays a flow diagram having a plurality of nodes, each node corresponding to a respective data set having a respective plurality of data fields;
  in response to receiving a first user input selecting a first node in the flow diagram, displaying, in the profile pane, information about a first data set corresponding to the first node, including displaying distributions of data values for one or more of the data fields from the first data set;
  receiving a second user input to concurrently select a second node in the flow diagram; and
  in response to the second user input:
    forming a composite data set comprising a union of (i) the first data set and (ii) a second data set corresponding to the second node;
    grouping data values for each of a plurality of data fields in the composite data set to form a respective set of bins; and
    displaying, in the profile pane, distributions of data values for the plurality of data fields in the composite data set, each distribution comprising the respective set of bins for a respective data field, wherein each displayed bin depicts counts of data values in the respective bin originating from each of the first and second data sets.

* * * * *